(No Model.)  2 Sheets—Sheet 1.

C. A. SNOW.
ANIMAL TRAP.

No. 526,587. Patented Sept. 25, 1894.

WITNESSES
H. Walker
C. Sedgwick

INVENTOR
C. A. Snow
BY
Munn & Co.
ATTORNEYS.

(No Model.) 2 Sheets—Sheet 2.

C. A. SNOW.
ANIMAL TRAP.

No. 526,587. Patented Sept. 25, 1894.

WITNESSES:
H. Walker
E. Sedgwick

INVENTOR
C. A. Snow
BY
Munn & Co
ATTORNEYS.

UNITED STATES PATENT OFFICE.

CHARLES A. SNOW, OF LIME SPRINGS, ASSIGNOR OF ONE-HALF TO CONRAD W. GIESEN, OF CALMAR, IOWA.

ANIMAL-TRAP.

SPECIFICATION forming part of Letters Patent No. 526,587, dated September 25, 1894.

Application filed October 14, 1893. Serial No. 488,152. (No model.)

*To all whom it may concern:*

Be it known that I, CHARLES A. SNOW, of Lime Springs, in the county of Howard and State of Iowa, have invented a new and Improved Animal-Trap, of which the following is a full, clear, and exact description.

My invention relates to improvements in that class of traps which are used for catching small animals, particularly rats and noxious animals; and the object of my invention is to produce a trap which is readily sprung, which when sprung sets a knife in motion and kills the animal springing it, and which after killing the animal resets itself ready for another operation.

To this end my invention consists of certain features of construction and combinations of parts, as will be hereinafter described and claimed.

Reference is to be had to the accompanying drawings, forming a part of this specification, in which similar figures of reference indicate corresponding parts in all the views.

Figure 1:
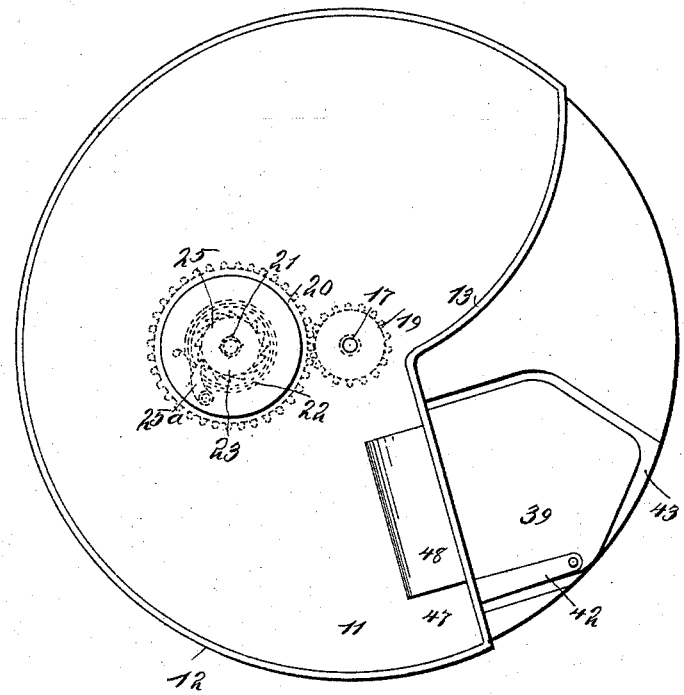
Figure 2:
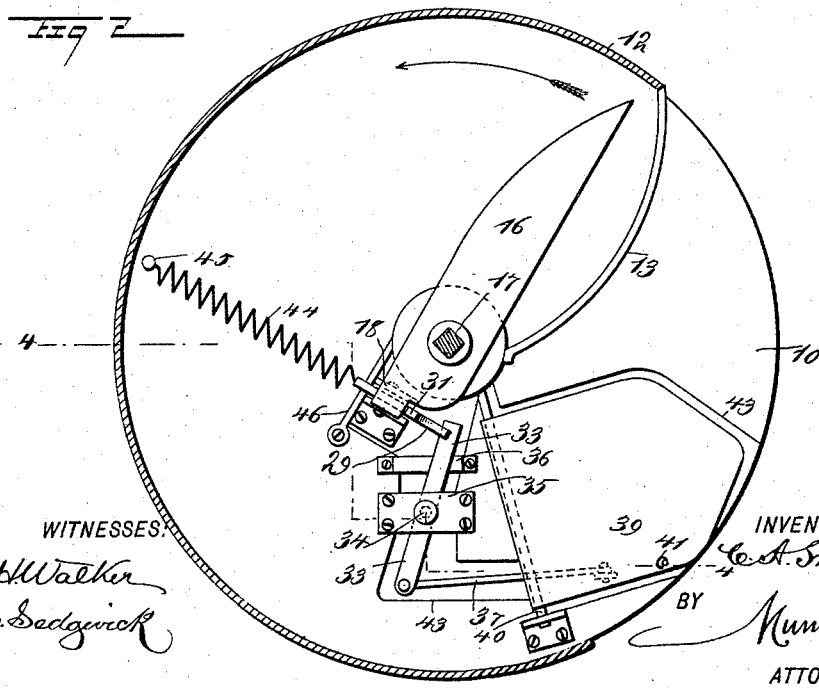
Figure 3:
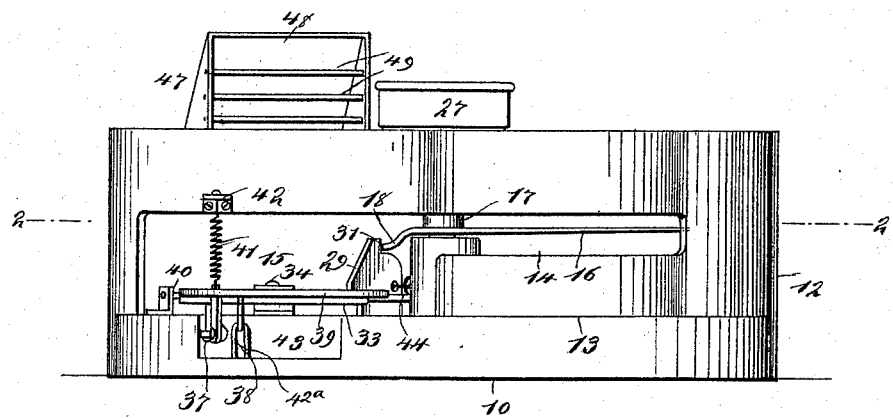
Figure 4:
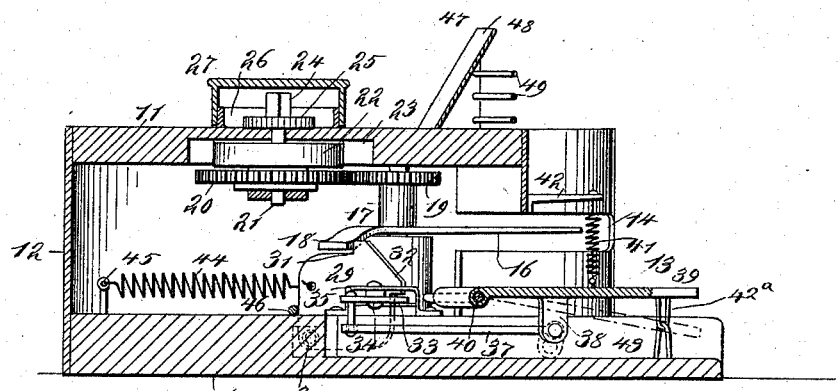

Figure 1 is a plan view of the trap embodying my invention. Fig. 2 is a sectional plan on the line 2—2 of Fig. 3. Fig. 3 is a front elevation of the trap; and Fig. 4 is a vertical cross section on the line 4—4 of Fig. 2.

The trap is preferably of a circular or cylindrical shape, although this is not essential, and it is provided with a bottom 10, which forms its base, a top 11 held parallel with the base, and a side wall 12 secured to the top and bottom and made preferably of sheet metal. The case thus formed is cut away on the front side, as shown at 13, so as to expose the base 10 which forms a sort of platform on which an animal may step conveniently, and as the tripping platform, to be hereinafter described, is held nearly at the same level as this extension of the base, the animal is deceived and more easily led to step on the tripping platform and spring the trap.

The wall 12 of the case is slotted on its front side, as shown at 14 and 15, to provide for the swing or revolution of the knife 16, which knife turns horizontally, being carried by the shaft 17 to which it is secured, and the shank of the knife is bent downward, as shown at 18, and projected on the side of the shaft opposite the knife blade, so that it may engage the trigger to be hereinafter described. The shaft 17 is provided with a gear wheel 19 which engages a gear wheel 20 which turns loosely on a shaft 21, this being arranged vertically in suitable bearings in the top of the trap, and on the shaft is a coil spring 22, one end of which is secured to the shaft and the other to the gear wheel 20, so that when the spring is wound its tension will cause the wheel to revolve, the arrangement being substantially like that of the ordinary clock movement. The spring 22 is held preferably in a recess 23 in the top 11 of the trap, and the shaft 21 has its upper end projected above the trap top and squared, as shown at 24, to receive a key. The shaft is also provided with the usual ratchet wheel 25 and pawl 25ª to prevent it from turning back. The trap top has an annular flange 26 which encircles and protects the ratchet wheel 25, and over this is placed a cover 27 so that the shaft 21 is hidden.

The shaft 17 is prevented from turning under the impulse of the spring 22 by a trigger 29, which is pivoted in the bottom of the case, as shown at 30, and which has on its upper side a shoulder 31 which extends into the path of the shank 18 of the knife, and which thus prevents the movement of the knife. The trigger has also on one side a second shoulder 32 beneath which swings a tripping lever 33, and this tripping lever prevents the trigger from being thrown down by the pressure of the spring 22 on the driving shaft of the knife 16.

The tripping lever 33 is held horizontally, is fulcrumed near the center, as shown at 34, and swings between suitable keepers 35 and 36. The outer end of the lever 33 connects by means of a rod 37 with a lug 38 on the under side of a tripping platform 39, which platform extends outward over the front portion of the base 10 and lies but little above the base. The platform 39 is hinged at its inner end, as shown at 40, and it is held normally upward by a light spiral spring 41 which is secured to the platform near one edge and connects with an arm 42 fastened to the front of the trap wall above the platform while links 42ª beneath the platform prevent it from being raised too high.

The spring 41, by holding the platform up as shown in Fig. 4, holds the connecting rod 37 and lever 33 in position to maintain the trigger 29 in the position shown in Fig. 4, so that the knife cannot revolve. To provide for the movement of the platform and of the lever and connecting rod just referred to, the base 10 is recessed, as shown at 43, and this enables the said mechanism to be placed very low on the trap.

The trigger 29 is normally pulled back into position to engage the shank 18 of the knife by a spiral spring 44 which is secured to the upper portion of the trigger and to a support 45 or equivalent support on the back part of the trap, and the trigger is pulled back against an abutment which, in the present instance, is a rod 46 fastened to the base 10 near the back of the recess 43. The tension of the spring 44 is very much less than the tension of the spring 22, so that when the lever 33 is swung from beneath the shoulder 32, the pressure of the shank 18 on the shoulder 31 will tilt the trigger 29 so that the knife may revolve and it swings through the opening 13 and slot 14 so as to cut in two any animal which may be in its path.

On the top of the trap, near the front side, is a bait box 47, comprising a hood 48 which is open in front and a series of cross bars 49 which extend across the front of the hood so that the bait may be conveniently placed in the box, and it will be exposed to the view of any animal in front of the trap and its open construction also permits the odor of the bait to escape freely.

It will be seen that the arrangement of the bait box is such that an animal in attempting to reach it will inevitably step on the tripping platform 39. When he does so the platform is depressed, and this causes the rod 37 to be pushed back, which moves the lever 33 and swings the inner end of the lever from beneath the shoulder 32 of the trigger 29. The instant this occurs the knife 16, impelled by the spring 22 and the connected gearing, swings quickly around through the opening 13 and strikes and kills the animal on the platform.

When the knife strikes the animal it does so with sufficient force to sweep him from the platform 39, and the instant the platform is freed of the weight, the spring 41 raises it, and the connecting rod 37 and lever 33 are thus actuated so that the lever swings again into the path of the shoulder 32, while the spring 44 pulls the trigger back into the position shown in Fig. 4, so that by the time the knife makes a revolution, the trigger will be in position to again engage the shank of the knife and will be held rigidly by the lever 33. It will thus be seen that when the spring 22 is once wound up, the trap may be sprung many times and will continually reset itself, so that the whole force of the spring may be utilized and the trap made to kill many animals without resetting.

Having thus described my invention, I claim as new and desire to secure by Letters Patent—

1. An animal trap, comprising a revoluble and spring actuated knife, a trigger engaging the knife for holding it stationary, a tilting platform arranged below the path of the knife and adapted to be depressed by the weight of the animal, and intermediate mechanism between the trigger and platform for disengaging the trigger from the knife when the platform is depressed, substantially as described.

2. An animal trap, comprising a revoluble and spring actuated knife, a trigger engaging the knife to hold it stationary, a tripping lever engaging the trigger, a tilting platform arranged below the path of the knife, and a connection between the platform and tripping lever, substantially as described.

3. An animal trap, comprising a horizontal spring-revolved knife, a spring-repressed trigger having a shoulder extending into the path of the knife shank, and a second shoulder, a swinging lever adapted to move beneath the second shoulder of the trigger, a spring-supported tilting platform, and means for swinging the lever from beneath the shoulder by the tilting of the platform, substantially as described.

4. An animal trap, comprising a horizontal slotted case, a spring-revolved knife adapted to swing through the slot in the case, a tilting platform mounted on the base of the trap and beneath the path of the knife, a trigger mechanism actuated by the tilting of the platform and adapted to release the knife, and a bait box supported on the trap above the platform, substantially as described.

5. An animal trap, comprising a revoluble and spring actuated knife, a pivoted and spring pressed trigger engaging the knife to hold it stationary, a pivoted tripping lever engaging the trigger, a pivoted and spring held platform, and a connection between the platform and tripping lever, substantially as described.

6. The combination, with the revoluble spring-pressed knife having a shank extending beyond its driving shaft, of the tilting spring-repressed trigger having on its upper side a shoulder to engage the knife shank, and a second shoulder on one side, a swinging lever adapted to move beneath the second shoulder of the trigger, a tilting spring-supported platform, and a connecting rod extending from the platform to one end of the swinging lever, substantially as described.

CHARLES A. SNOW.

Witnesses:
J. F. THOMPSON,
C. N. FLAGLER.